(12) United States Patent
Manfreda et al.

(10) Patent No.: US 11,692,375 B2
(45) Date of Patent: Jul. 4, 2023

(54) CONSENSUS BUILDING AMONG NETWORKED DEVICES FOR RECREATIONAL VEHICLE SAFETY SYSTEMS

(71) Applicant: Lippert Components, Inc., Mishawaka, IN (US)

(72) Inventors: John Peter Manfreda, St. Clair Shores, MI (US); Anthony J. DiPerna, Troy, MI (US); Aaron Robertson Harris, Washington, MI (US); Matthew Allen Collin, Ferndale, MI (US)

(73) Assignee: Lippert Components Inc., Elkhart, IN (US)

( * ) Notice: Subject to any disclaimer, the term of this patent is extended or adjusted under 35 U.S.C. 154(b) by 556 days.

(21) Appl. No.: 16/795,802

(22) Filed: Feb. 20, 2020

(65) Prior Publication Data

US 2020/0291693 A1    Sep. 17, 2020

Related U.S. Application Data

(60) Provisional application No. 62/818,392, filed on Mar. 14, 2019.

(51) Int. Cl.
| | | |
|---|---|---|
| E05B 77/54 | (2014.01) | |
| B60R 16/023 | (2006.01) | |
| G05B 9/02 | (2006.01) | |
| G07C 9/00 | (2020.01) | |

(52) U.S. Cl.
CPC ............ *E05B 77/54* (2013.01); *B60R 16/023* (2013.01); *G05B 9/02* (2013.01); *E05Y 2400/45* (2013.01); *E05Y 2400/52* (2013.01); *E05Y 2900/512* (2013.01)

(58) Field of Classification Search
USPC .......................................................... 701/36
See application file for complete search history.

(56) References Cited

U.S. PATENT DOCUMENTS

| | | |
|---|---|---|
| 5,312,119 A | 5/1994 | Schneider et al. |
| 5,835,873 A | 11/1998 | Darby et al. |
| 6,345,854 B1 | 2/2002 | McManus |

(Continued)

OTHER PUBLICATIONS

EP Search Report for corresponding EP Pat. App. No. 20161590, dated Jul. 21, 2020.

*Primary Examiner* — Tyler D Paige
(74) *Attorney, Agent, or Firm* — Mechanicus, PLLC (57) ABSTRACT

A distributed safety lockout system for a vehicle, such as a recreational vehicle (RV), that includes a plurality of networked devices communicatively coupled via a communications network, and that is configured to implement a method for controlling an electromechanical operation of an electromechanical device based on a safety lockout condition determined through use of a consensus protocol in which a safety lockout status is agreed upon by the networked devices. The safety lockout status may be escalated by a safety lockout condition detection device that detects a safety lockout condition, such as movement of the RV. The safety lockout status may be de-escalated through a network contention mode of the consensus protocol in which each of the networked devices agree to de-escalate the safety lockout status.

22 Claims, 6 Drawing Sheets

(56) References Cited

U.S. PATENT DOCUMENTS

| | | | |
|---|---|---|---|
| 6,590,758 B1* | 7/2003 | Friede | H01H 47/001 |
| | | | 361/170 |
| 6,654,910 B1 | 11/2003 | Eibach et al. | |
| 7,620,465 B2 | 11/2009 | Degoul et al. | |
| 8,374,734 B2 | 2/2013 | Broquet et al. | |
| 9,139,123 B2 | 9/2015 | Cepynsky | |
| 9,365,222 B2 | 6/2016 | Hawthorne et al. | |
| 9,679,735 B2 | 6/2017 | Smith et al. | |
| 2014/0210593 A1* | 7/2014 | Cattermole | G08C 17/02 |
| | | | 340/12.5 |
| 2016/0167653 A1 | 6/2016 | Malone et al. | |
| 2016/0189543 A1 | 6/2016 | Altintas et al. | |
| 2017/0139411 A1 | 5/2017 | Hartung et al. | |
| 2018/0022325 A1* | 1/2018 | Garceau | B60S 9/02 |
| | | | 180/41 |
| 2018/0171663 A1 | 6/2018 | Ebner | |
| 2018/0201285 A1* | 7/2018 | Brooks | B61C 17/00 |
| 2018/0349235 A1 | 12/2018 | Freydel et al. | |

* cited by examiner

CONSENSUS BUILDING AMONG NETWORKED DEVICES FOR RECREATIONAL VEHICLE SAFETY SYSTEMS

CROSS-REFERENCES TO RELATED APPLICATIONS

This application claims priority in U.S. Provisional Patent Application Ser. No. 62/818,392 filed Mar. 14, 2019, which is incorporated herein in its entirety, by reference.

FIELD

This application relates generally to an electronic communications network used for communications in a safety lockout system of a recreational vehicle.

BACKGROUND

Recreational vehicles are known to include electronic controllers (referred to also as controls) designed to implement circuitry that detects and responds to safety lockout conditions. This approach can be inefficient when multiple electronic controllers are used in the same system. For example, many modern RVs have a safety lockout system that has separate controllers for slideouts, awnings, levelers, door locks, etc., with each such controller having to implement the safety interlock circuitry independently. A safety lockout system is a system that prevents certain electromechanical operations from being carried out when those operations may result in a reduction of safety, and the term "lockout" generally refers to prevention or inhibition of this functionality. Another drawback of the state of the art is that different controllers may detect the lockout condition differently, which can lead to inconsistent behavior between the controllers.

SUMMARY

According to one embodiment, there is provided a method for controlling an electromechanical operation of an electromechanical device based on a safety lockout condition determined using a distributed safety lockout system, the distributed safety lockout system comprising a plurality of networked devices communicatively coupled via a communications network, the plurality of networked devices including one or more electronic controllers and a plurality of safety lockout condition detection devices. The method includes, at one or more of the plurality of networked devices: (i) receiving a safety lockout status from another networked device via the communications bus; (ii) comparing a local safety lockout status to the received safety lockout status; (iii) determining whether to update the local safety lockout status based on results of comparing the local safety lockout status to the received safety lockout status and, when it is determined to update the local safety lockout status, then updating the local safety lockout status to the received safety lockout status; and (iv) broadcasting the local safety lockout status over the communications bus. The method further includes, at one or more of the plurality of safety lockout condition detection devices: (i) determining a proposed safety lockout status based on sensor data obtained by the safety lockout device; (ii) comparing the proposed safety lockout status to the local safety lockout status and/or a received safety lockout status that is received from another networked device over the communications bus; and (iii) determining an updated local safety lockout status to be the local safety lockout status based on comparing the proposed safety lockout status to the local safety lockout status and/or the received safety lockout status. The method further includes, at any of the one or more electronic controllers, controlling an electromechanical operation of an electromechanical device based on the local safety lockout status.

According to various embodiments, this method may further include any technically-feasible combination of the following features:

- the distributed safety lockout system is installed on a recreational vehicle;
- the distributed safety lockout system includes a plurality of electronic controllers including the one or more electronic controllers and a plurality of electromechanical devices including the electromechanical device(s), and wherein each of the plurality of electromechanical devices is controlled by a different one of the plurality of electronic controllers;
- a first electronic controller of the plurality of electronic controllers controls the electromechanical operation of a first electromechanical device of the plurality of electromechanical devices, wherein a second electronic controller of the plurality of electronic controllers controls the electromechanical operation of a second electromechanical device of the plurality of electromechanical devices, and wherein the first electronic controller operates independently of the second electronic controller;
- the first electromechanical device is a leveler that is installed on the recreational vehicle, and wherein the second electromechanical device is a slide-out that is installed on the recreational vehicle;
- the plurality of safety lockout condition detection devices include a first safety lockout condition detection device and a second safety lockout condition detection device, wherein the first safety lockout condition detection device is configured to detect a first safety lockout condition, wherein the second safety lockout condition detection device is configured to detect a second safety lockout condition that is different from the first safety lockout condition;
- the first safety lockout condition and the second safety lockout condition are each based on at least one of the following: global navigation satellite system (GNSS) signals received at a GNSS receiver, a parking brake status, a trailer brake status, a tow vehicle brake status, a tow vehicle brake light status, or an orientation or movement detected by a movement/orientation sensor, and wherein the first safety lockout condition is different than the second safety lockout condition;
- the communications network is a wired controller area network (CAN) bus or a wired local interconnect network that is installed on the recreational vehicle;
- the communications network is a wireless communications network that is carried out using a dedicated short-range communication (DSRC) network that is provided on the recreational vehicle;
- the communications network includes a wireless communications network used by a first one of the networked devices and a wired communications network used by a second one of the networked devices;
- one or more of the networked devices operate according to a consensus protocol that includes a network duplication mode and a network contention mode, wherein, when in the network contention mode, one or more of the networked devices votes to establish a consensus as to whether the local safety lockout status of each of the networked devices is to be de-escalated; and/or in response to a first one of the networked devices issuing a clear request when each of the networked devices are operating in the network duplication mode, each of the networked devices transitions to operate in the network contention mode to establish consensus.

According to one embodiment, there is provided a distributed safety lockout system for a recreational vehicle, wherein the system includes a plurality of networked devices installed on an electromechanical system, and wherein the plurality of networked devices being communicatively coupled via a communications bus. The plurality of networked devices include: (i) one or more electronic controllers, each of which is configured to control an electromechanical device of the recreation vehicle based on a local safety lockout status; and (ii) a plurality of safety lockout condition detection devices, each of which is configured to detect a safety lockout status based on sensor information obtained by lockout detection circuitry. Further, one or more of the plurality of networked devices are configured to alternate between a network duplication mode and a network contention mode and, when operating in the network duplication mode, to determine an updated local safety lockout status based on a comparison of the local safety lockout status to a received lockout safety status, the received lockout safety status being received over the communications bus from another one of the networked devices; and when operating in the network contention mode, each device of the plurality of safety lockout condition detection devices is configured to obtain the detected safety lockout status based on the sensor information, to compare the detected safety lockout status to the local safety lockout status and/or a received proposed safety lockout status, to set the local safety lockout status based on the comparison, and to broadcast the local safety lockout status over the communications bus.

According to various embodiments, this system may further include any technically-feasible combination of the following features:
- the distributed safety lockout system includes a plurality of electronic controllers including the one or more electronic controllers and a plurality of electromechanical devices including the electromechanical device(s), and wherein each of the plurality of electromechanical devices is controlled by a different one of the plurality of electronic controllers;
- a first electronic controller of the plurality of electronic controllers controls the electromechanical operation of a first electromechanical device of the plurality of electromechanical devices, wherein a second electronic controller of the plurality of electronic controllers controls the electromechanical operation of a second electromechanical device of the plurality of electromechanical devices, and wherein the first electronic controller operates independently of the second electronic controller;
- the first electromechanical device is a leveler that is installed on the recreational vehicle, and wherein the second electromechanical device is a slide-out that is installed on the recreational vehicle;
- the plurality of safety lockout condition detection devices include a first safety lockout condition detection device and a second safety lockout condition detection device, wherein the first safety lockout condition detection device is configured to detect a first safety lockout condition, wherein the second safety lockout condition detection device is configured to detect a second safety lockout condition that is different from the first safety lockout condition;
- the first safety lockout condition and the second safety lockout condition are each based on at least one of the following: global navigation satellite system (GNSS) signals received at a GNSS receiver, a parking brake status, a trailer brake status, a tow vehicle brake status, a tow vehicle brake light status, or an orientation or movement detected by a movement/orientation sensor, and wherein the first safety lockout condition is different than the second safety lockout condition;
- the communications network is a wired controller area network (CAN) bus or a wired local interconnect network that is installed on the recreational vehicle;
- the communications network is a wireless communications network that is carried out using a dedicated short-range communication (DSRC) network that is provided on the recreational vehicle;
- the communications network includes a wireless communications network used by a first one of the networked devices and a wired communications network used by a second one of the networked devices; and/or
- each of the networked devices operate according to a consensus protocol that includes the network duplication mode and the network contention mode, wherein, when in the network contention mode, each of the networked devices votes to establish a consensus as to whether the local safety lockout status of each of the networked devices is to be de-escalated.

BRIEF DESCRIPTION OF DRAWINGS

One or more embodiments will hereinafter be described in conjunction with the appended drawings, wherein like designations denote like elements, and wherein.

DETAILED DESCRIPTION

There is provided a distributed safety lockout system for a recreational vehicle (RV) having a plurality of networked devices that are communicatively coupled to one another via a local communications network, such as a communications bus installed on the RV. Also provided is a method of operating the distributed safety lockout system. The distributed safety lockout system is used to detect a safety lockout condition, such as whether the RV is presently travelling or moving, through use of lockout detection circuitry, software, and/or other logic configured to be executed or implemented by the plurality of networked devices. In at least some embodiments, the plurality of networked devices are distributed among the RV at different locations, are communicatively coupled to one another via a communications network, and are configured to operate according to a common protocol in order to establish a consensus as to the current safety lockout status. This common protocol is referred to herein as a consensus protocol.

In general, the plurality of networked devices includes one or more electronic controllers for controlling one or more electromechanical devices of the RV (e.g., a slide-out, an awning, or a leveler), and may also include one or more safety lockout condition detection devices for detecting a safety lockout condition. A safety lockout status is a status that can be embodied in electronic data and that represents a status of the safety lockout system, which can be used by the electronic controller(s) to determine whether an electromechanical operation is permitted to be carried out. The safety lockout condition can be determined using different techniques among the safety lockout condition detection devices (e.g., movement based on GPS as detected by a first safety lockout condition detection device, parking brake not engaged as detected by a second safety lockout condition detection device) whereas the safety lockout status is more universal in the sense that the lockout status is used to indicate the severity or safety level, such as LEVEL 1, and which can be determined based on one or more safety lockout conditions. Any one or more of the networked devices can be integrated with, be locally connected to, and/or include an electronic controller and/or a safety lockout condition detection device.

There is provided a method for implementing a network defined "safety lockout severity level" feature on a communications network comprised of a plurality of electronic controls (or electronic controllers) that operate independent from each other. In some embodiments, the safety lockout is effectively a "network level ESTOP" signal that is broadcast to and duplicated by all networked devices across the network. In at least some embodiments, a network duplication mode is used to ensure the same safety lockout status (e.g., ESTOP level) is shared between all electronic controllers, and consensus building is used during a network contention mode to determine if/when conditions are correct to de-escalate the safety lockout status so as to permit electromechanical operations. In at least some embodiments, the distributed safety lockout system and method are used to implement a safety lockout for an RV having electromechanical devices (e.g., slide-outs, levelers, and awnings) while the RV is in motion, which may be detected by a first safety lockout condition detection device through, for example, receiving GNSS signals at a GNSS receiver.

The distributed safety lockout system and method are designed and/or configured to replace various designs of "safety interlock/lockout trip circuits" implemented on various RV electronic controls. These circuits essentially act as smart breakers (either purely in hardware, or a combination of hardware/software), which, when tripped, prevent potentially unsafe operation of electronics and electromechanical systems. One example of such a circuit would be one that prevents the operation of RV slide-out systems when an RV is being driven down the road.

The distributed safety lockout system and method can be adapted to overcome at least some drawbacks of the current state of the art by decoupling the circuitry that detects the safety lockout condition (or the safety lockout condition detection devices) from the electronic controllers that respond to the safety lockout condition. This may be achieved by communicating the safety lockout status over a shared and local communications network that is provided by the RV. Any or all of the electronic controllers on the network may be configured to receive and react to the safety lockout status, regardless of whether the electronic controller includes any circuitry to detect the safety lockout condition. In at least some embodiments, only select networked devices implement the circuitry required to detect the safety lockout condition and these networked devices are referred to as safety lockout condition detection devices. In at least some embodiments, these safety lockout condition detection devices have safety lockout circuitry or mechanisms that detect a safety condition (or determine the safety lockout status) in different ways; for example: a first safety lockout condition detection device may detect a safety lockout condition (or determine a safety lockout status) by using a GPS circuit to detect movement of the vehicle, while a second safety lockout condition detection device may detect a safety lockout condition (or determine a safety lockout status) by using circuitry to detect that the parking brake of the RV has been disengaged.

To prevent confusion as a result of different safety lockout statuses being reported by different safety lockout condition detection devices, the consensus protocol may be used to build consensus among the otherwise independent networked devices. In at least one embodiment, the protocol allows for any networked device on the communications network to "escalate" the lockout severity level at will; that is, any safety lockout condition detection device may raise the severity level of the safety lockout status. At least in some embodiments, this safety lockout status is akin to an electronic E-STOP that may be triggered by any safety lockout condition detection device on the network, and the consensus protocol causes all other networked devices to duplicate, report, and abide by the safety lockout status.

In at least one embodiment, by causing all networked devices to abide by the safety lockout status, the distributed safety lockout system and method eliminates or at least reduces the possibility for inconsistent behavior among electronic controllers. The distributed safety lockout system and method may be used to copy or duplicate the state of the lockout (or safety lockout status) to all networked devices on the communications network, thereby effectively turning all networked devices into "lockout state reporters," regardless of whether a particular networked device implements any safety lockout detection circuitry. Thus, according to at least some embodiments, all networked devices of the system are capable of echoing/reporting the current state of the lockout (or the safety lockout status) to other networked devices. In this way, the safety lockout condition persists, even if the safety lockout condition detection device that detected the safety lockout condition is powered down, fails, or is otherwise removed from the network. To prevent errant clearing of the safety lockout status, all networked devices "vote" to ensure consensus is reached before determining to clear or reset the safety lockout status. This prevents a single errant networked device from unilaterally clearing the local safety lockout statuses of each of the networked devices. For example: if a first safety lockout condition detection device determines that the safety lockout status is to be reset (i.e., set to a base value), but a second safety lockout condition detection device decides against it, then the second safety lockout condition detection device votes to maintain the safety lockout status at its current level or status. Thus, in at least some embodiments, this will prevent inconsistent or unsafe behavior among the networked devices. As used herein, a "base value" is the value used to represent that there has been no safety concern detected by the system. In some embodiments, the base value is implemented as being a zero or minimal value. The safety lockout status may be elevated from the base value to an elevated value when a safety lockout condition is detected.

In at least some embodiments, a communications network and the consensus protocol that is common to all networked devices are used to communicate the state of the lockout between otherwise independent safety lockout condition detection devices or other networked devices. It should be appreciated that, in one embodiment, the consensus protocol, as implemented at each of the networked devices, may be the same—that is, the consensus protocol is embodied in a single set of computer instructions (representing a single version of the consensus protocol) that is used by each of the networked devices in conjunction with specific parameters stored for the particular networked device. For example, a single computer program is installed on each of the networked devices, including the safety lockout detection devices, the electronic controllers, and the passive networked devices. Then, in such an example, each of the networked devices can include other networked device-specific data that is locally stored at the respective networked device and used as a part of carrying out the consensus protocol. For example, certain types of networked devices (e.g., safety lockout condition detection devices) may carry out different steps as a part of the consensus protocol, such as determining a proposed safety lockout status based on detecting a safety lockout condition. The networked device-specific data (e.g., a flag) can thus be used as input into the computer program that then cause the networked device to take certain steps that are particular to that networked device or that type of networked device.

In another embodiment, different types of networked devices can implement a different version of the consensus protocol as embodied in different sets of computer instructions. For example, a safety lockout condition detection device may include a first version of the consensus protocol that includes steps for detecting a safety lockout condition, and other types of networked devices may include a second version of the consensus protocol that does not include or omits those steps that are used for detecting a safety lockout condition.

At least in some embodiments, the safety lockout condition detection devices escalate the severity level of the detected lockout individually and independently in response to detecting a particular safety lockout condition; that is, any safety lockout condition detection device may escalate the lockout severity status at will. Then, this escalated safety lockout status is broadcast over the communications network to the other safety lockout condition detection devices and/or other networked devices, which will then respond in kind, such as by acknowledging and abiding by the safety lockout status. In at least some embodiments, all of the safety lockout condition detection devices vote to reach a consensus prior to de-escalating the severity level (or safety lockout status); in some embodiments, all networked devices vote to reach a consensus prior to de-escalating the severity level (or safety lockout status). This ensures that no single safety lockout condition detection device (or networked device) can de-escalate the safety lockout status alone since the other safety lockout condition detection devices on the network must vote and agree in kind. The consensus protocol causes the networked devices to each duplicate and broadcast the safety lockout status to all networked devices on the network. Thus, through this consensus protocol, all networked devices observe the same safety lockout status and, therefore, the loss or failure of any one networked device (e.g., due to power down, failure) will not cause the lockout mechanism to fail, thereby preventing unsafe operation of electromechanical systems of the RV.

Figure 1:
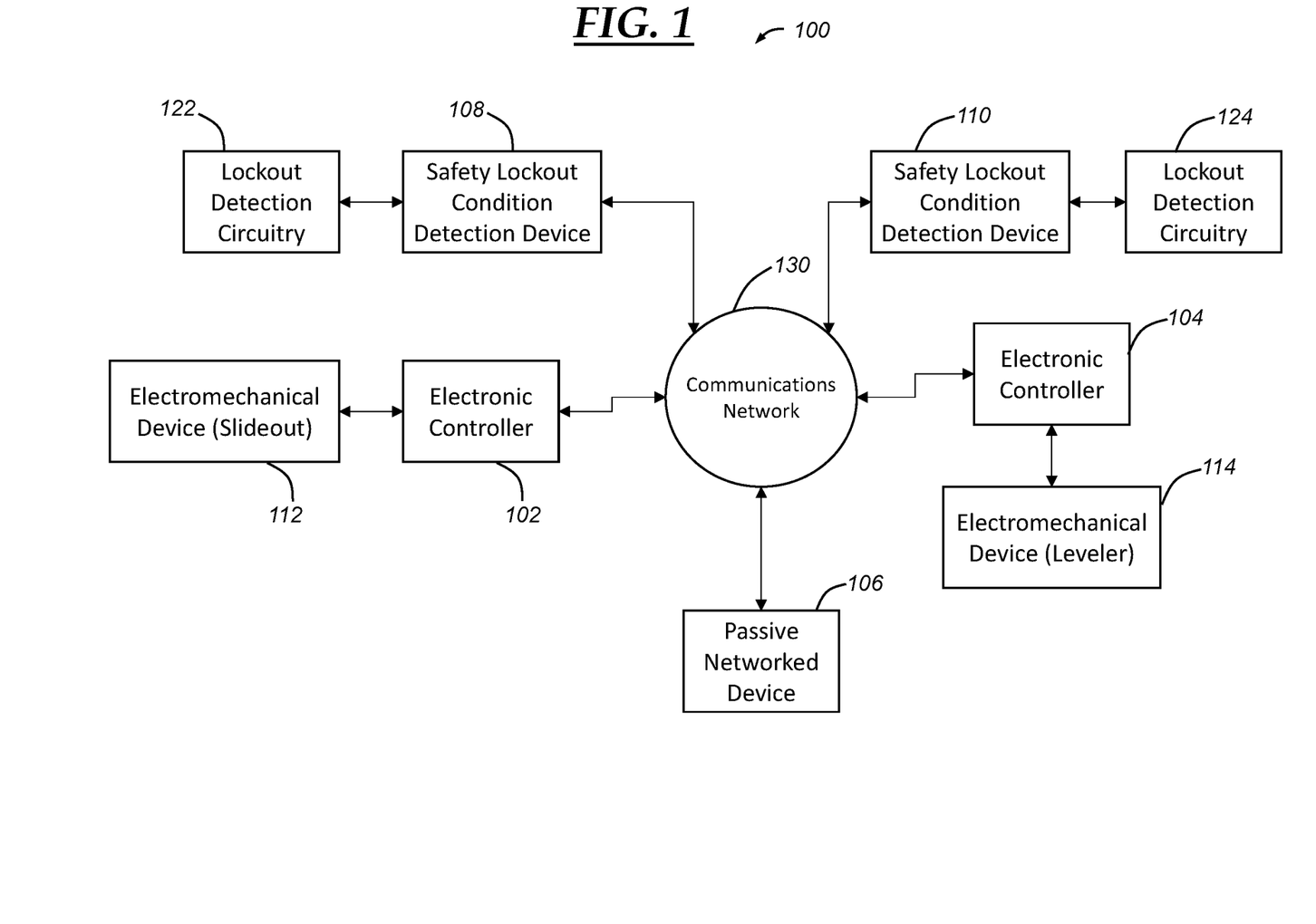
FIG. 1 is a block diagram depicting an embodiment of a distributed safety lockout system for a recreational vehicle (RV) that is capable of carrying out the method disclosed herein.

As shown in the embodiment of FIG. 1, the distributed safety lockout system 100 includes networked devices 102-110 that are installed on a recreational vehicle (RV), and that are communicatively coupled via a communications network 130. The plurality of networked devices 102-110 includes a plurality of safety lockout condition detection devices, a plurality of electronic controllers, and a passive networked device. In the illustrated embodiment, two of the networked devices are electronic controllers 102, 104 that are programmed to control an electromechanical device of the RV. For example, a first one of the electronic controllers 102 controls an electromechanical slide-out for the RV and a second one of the electronic controllers 104 controls an electromechanical leveler for the RV. Also, in the illustrated embodiment, two of the networked devices are safety lockout condition detection devices 108, 110 that are capable of detecting a safety lockout condition using their respective lockout detection circuitry 122, 124. Further, one of the networked devices is a passive networked device 106, which is a networked device that is neither a safety lockout condition detection device nor an electronic controller. Of course, according to various embodiments, any suitable number of safety lockout condition detection devices, electronic controllers, and passive devices may be used.

Each of the networked devices 102-110 includes one or more processors and/or memory, and may include other electronic components, such as modems, network interface cards, etc. The processors can be any suitable device for executing computer instructions, which can be stored on memory of the networked device or other memory accessible to the networked device. In some embodiments, all devices on the network can participate in the method; however, in other embodiments, one or more devices on the network may not participate. In at least some embodiments, each of the devices on the network that are participating includes computer instructions embodied in memory and that, when executed by the processor of the networked device, causes the networked device to carry out operations according to the consensus protocol, which includes a network duplication mode and a network contention mode, and/or according to other functionality described herein.

Each of the electronic controllers 102, 104 includes computer instructions that enable the electronic controller to control at least one electromechanical operation of at least one electromechanical device 112, 114. The electronic controllers 102, 104 are each coupled to the electromechanical devices 112, 114, respectively, and, in at least some embodiments, each of the electronic controllers 102, 104 is used to control a different electromechanical device. For example, a first electronic controller controls electromechanical operations of a leveler of the RV (i.e., an example of a first electromechanical device), such as extending and/or retracting one or more jacks of the leveler, and a second electronic controller controls electromechanical operations of a slide-out of the RV (i.e., an example of a second electromechanical device), such as extending and/or retracting a slide-out room of the RV. Other types of electromechanical devices may be used, as those discussed herein are merely exemplary.

Each of the safety lockout condition detection devices 108, 110 is coupled to lockout detection circuitry 122, 124, which is used by each device 108, 110 to detect a safety lockout condition, which may then be used to determine a safety lockout status. In one embodiment, each of (or at least one of) the safety lockout condition detection devices detect a safety lockout condition that is different from a safety lockout condition detected by another safety lockout condition detection device. In such embodiments, the lockout detection circuitry of a first safety lockout condition detection device is of a different character and is independent from the lockout detection circuitry of a second safety lockout condition detection device. In one embodiment, the lockout detection circuitry of a first safety lockout condition detection device is a GNSS receiver that determines whether the vehicle is moving, and the lockout detection circuitry of a second safety lockout condition detection device is circuitry that is coupled to a parking brake of the RV and that is used to determine whether the parking brake is engaged. That is, in such an example, the first safety lockout condition detection device may detect a first safety lockout condition based on receiving global navigation satellite system (GNSS) signals at a GNSS receiver, and the second safety lockout condition detection device may detect a second safety lockout condition based on a status of a parking brake of the recreational vehicle. Other types of safety lockout condition detection devices and lockout detection circuitry thereof may be used, as those discussed herein are merely exemplary.

The communications network 130 is a local electronic data network and is illustrated in FIG. 1 as a controller area network (CAN) bus, however, any suitable type of wired or wireless communications network can be used, such as a local interconnect network (LIN) bus, Ethernet connection, other hardwired connection, dedicated short-range communications (DSRCs) (e.g., Wi-Fi™, Bluetooth™), etc. Each of the networked devices 102-110 can include the suitable equipment for carrying out communications over the communications network 130, such as a modem and/or a network interface card (NIC). In an embodiment where wireless communications are used, each of the networked devices can include wireless circuitry or a wireless chipset for carrying out wireless communications, which can be Wi-Fi™, Bluetooth™, or other suitable wireless communication technology.

Figure 2:
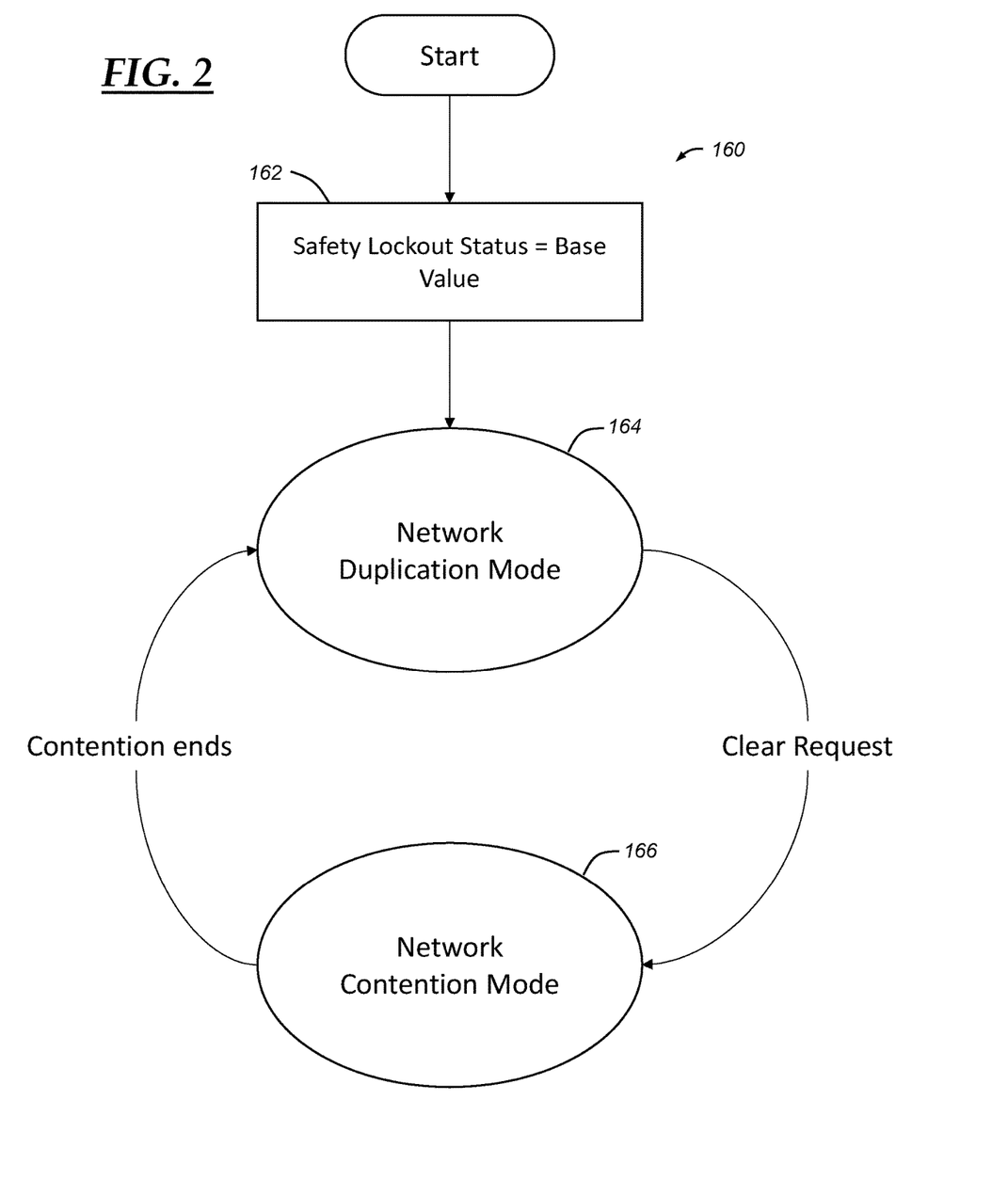
FIG. 2 is a state machine diagram for the distributed safety lockout system that illustrates two operating modes of the consensus protocol that are carried out by each of the networked devices according to one embodiment.

With reference to FIG. 2, there is shown a state machine diagram for the distributed safety lockout system that illustrates two operating modes of the consensus protocol that are carried out by each of the networked devices. The two operating modes of the consensus protocol is a network contention mode 166 and a network duplication mode 164, and the networked devices may alternate between each of these modes in a concerted fashion, at least in some embodiments. When the RV is turned on (e.g., an ignition is started, a key is inserted, the RV is placed into an accessory (ACC) state), a local safety lockout status can be set to the base value, which is indicated at 162.

Figure 3A:
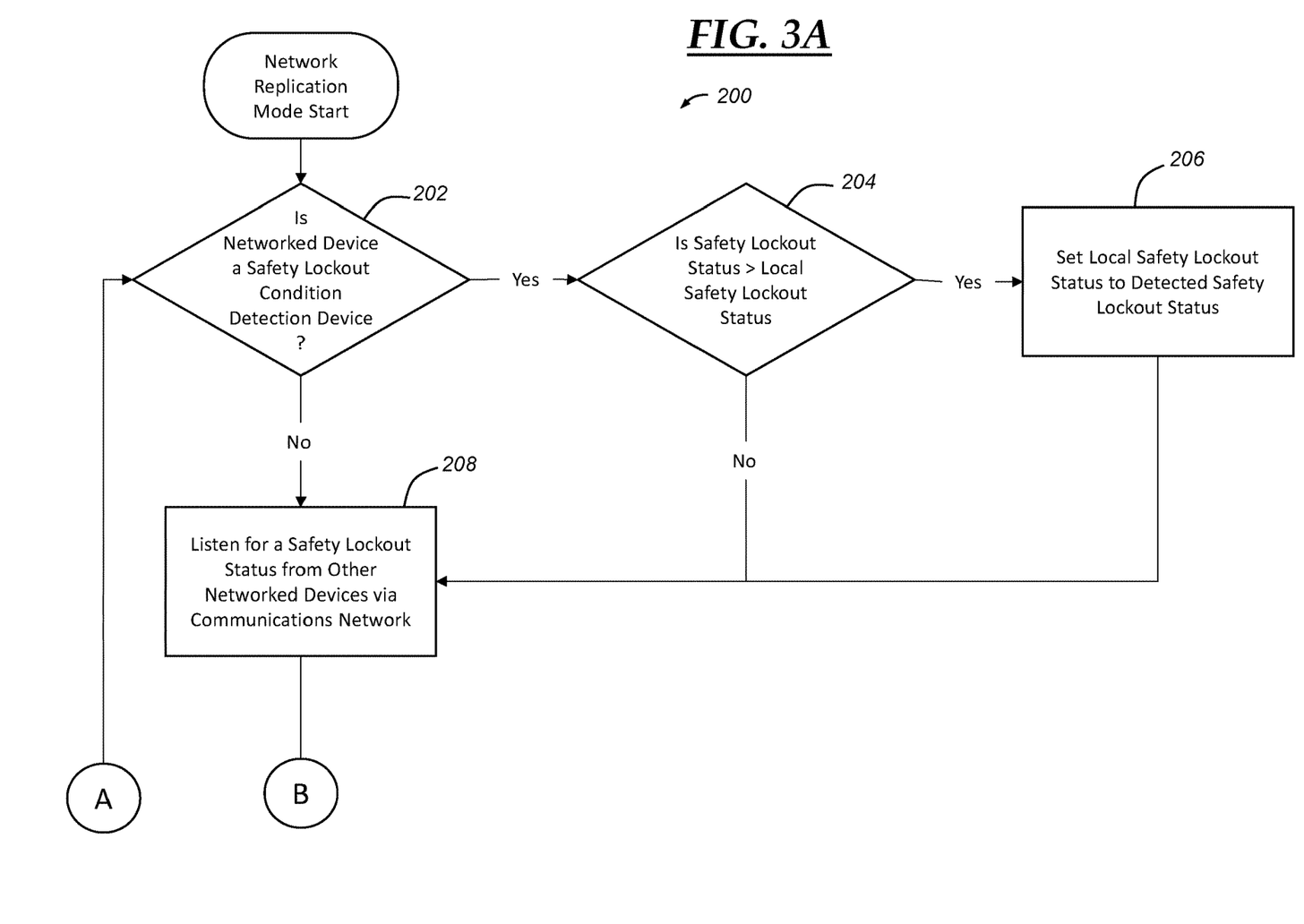
FIGS. 3A-3B illustrate a flowchart of an embodiment of a process for carrying out the network duplication mode at a networked device that can be used as a part of a method for controlling an electromechanical operation of an electromechanical device based on a safety lockout condition determined using a distributed safety lockout system for a recreational vehicle.
Figure 3B:
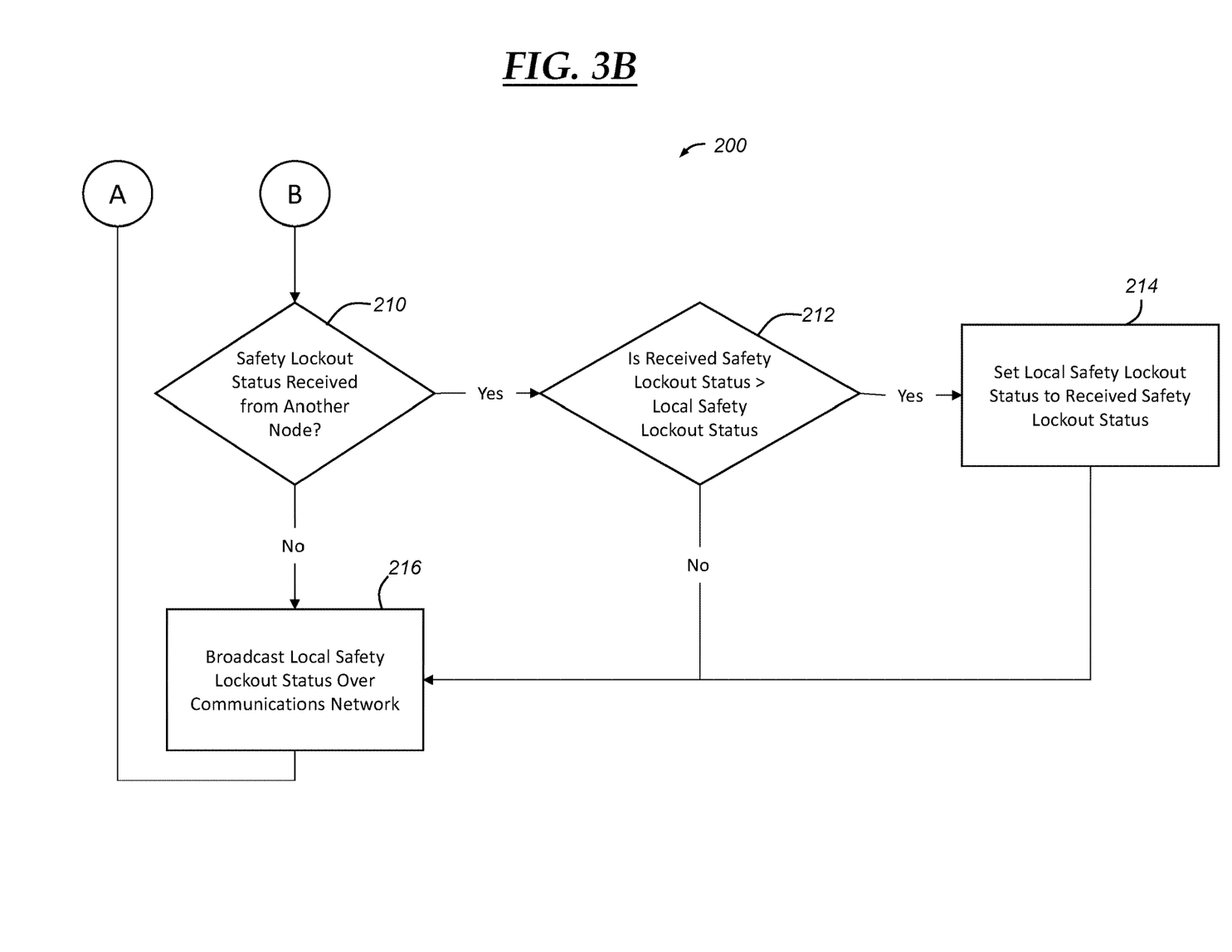

With reference to FIGS. 3A-3B, a process 200 for carrying out the network duplication mode 164 at a networked device is illustrated. In the network duplication mode 164, each networked device 102-110 listens for a safety lockout status from another networked device via the communications network 130 (step 208), and also broadcasts its safety lockout status (or local safety lockout status) over the communications network 130 (step 216). The local safety lockout status is a safety lockout status of the system as determined at a particular networked device—that is, each networked device has a local safety lockout status that is determined based on listening for safety lockout status(es) broadcast over the communications network and/or based on a proposed safety lockout status as determined by the networked device in the case the networked device is a safety lockout condition detection device. The local safety lockout status for a first networked device can be updated when the first networked device receives a broadcasted safety lockout status that is more severe (e.g., greater or higher) than the local safety lockout status. For example, if the local safety lockout status of the first networked device is a level 1 and the first networked device receives a safety lockout status of a level 2, then the first networked device can update its local safety lockout status to be a level 2, such as that which is illustrated in steps 212-214. In some embodiments, in step 216, one or more of the networked devices 102-110 each broadcasts the local safety lockout status at regular intervals (e.g., every 0.2 seconds).

Also, in the case of a safety lockout condition detection device operating in the network duplication mode (see step 202), when the lockout detection circuitry (e.g., lockout detection circuitry 122, 124) determines a safety lockout status that is higher than the local safety lockout status (step 204), then the local safety lockout status can be set to the detected (or proposed) safety lockout status (step 206).

The system/method can switch from the network duplication mode to the network contention mode when a single networked device transmits a clear request (CLEAR_REQUEST) over the communications network. In at least one embodiment, the clear request is transmitted upon a predetermined vehicle event, such as when the RV is turned on or started, or when the RV is placed into a particular transmission state (e.g., a park state of PRNDL, a reverse state of PRNDL). In one embodiment, the predetermined vehicle event can be when the safety lockout condition detection device detects no safety issue (or is considered to detect a condition represented by a base value) using the associated lockout detection circuitry. Alternatively or additionally, the clear request may be transmitted upon a predetermined amount of time passing while in the network duplication mode.

Figure 4A:
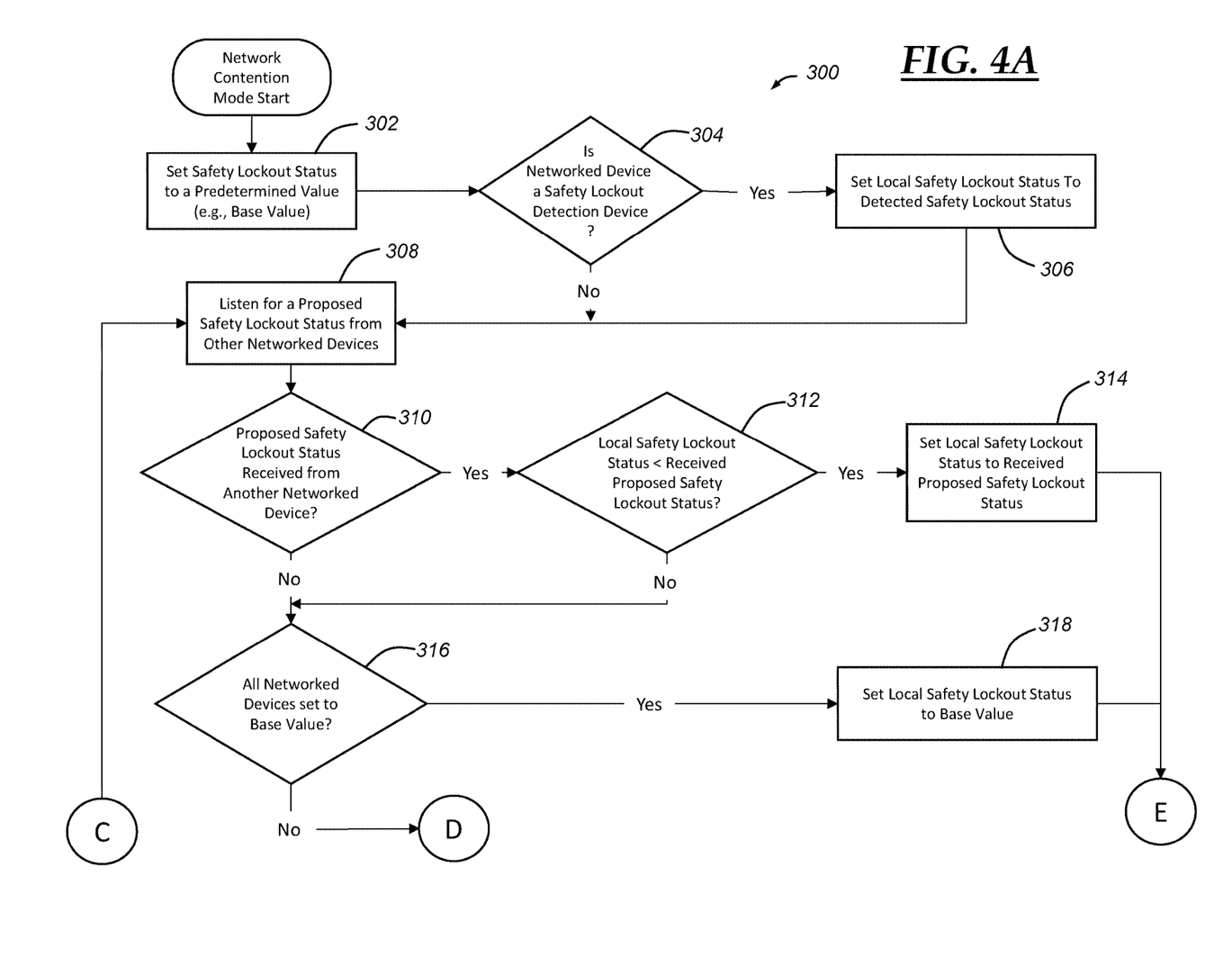
FIGS. 4A-4B illustrate a flowchart of an embodiment of a process for carrying out the network contention mode at a networked device that can be used as a part of a method for controlling an electromechanical operation of an electromechanical device based on a safety lockout condition determined using a distributed safety lockout system for a recreational vehicle.
Figure 4B:
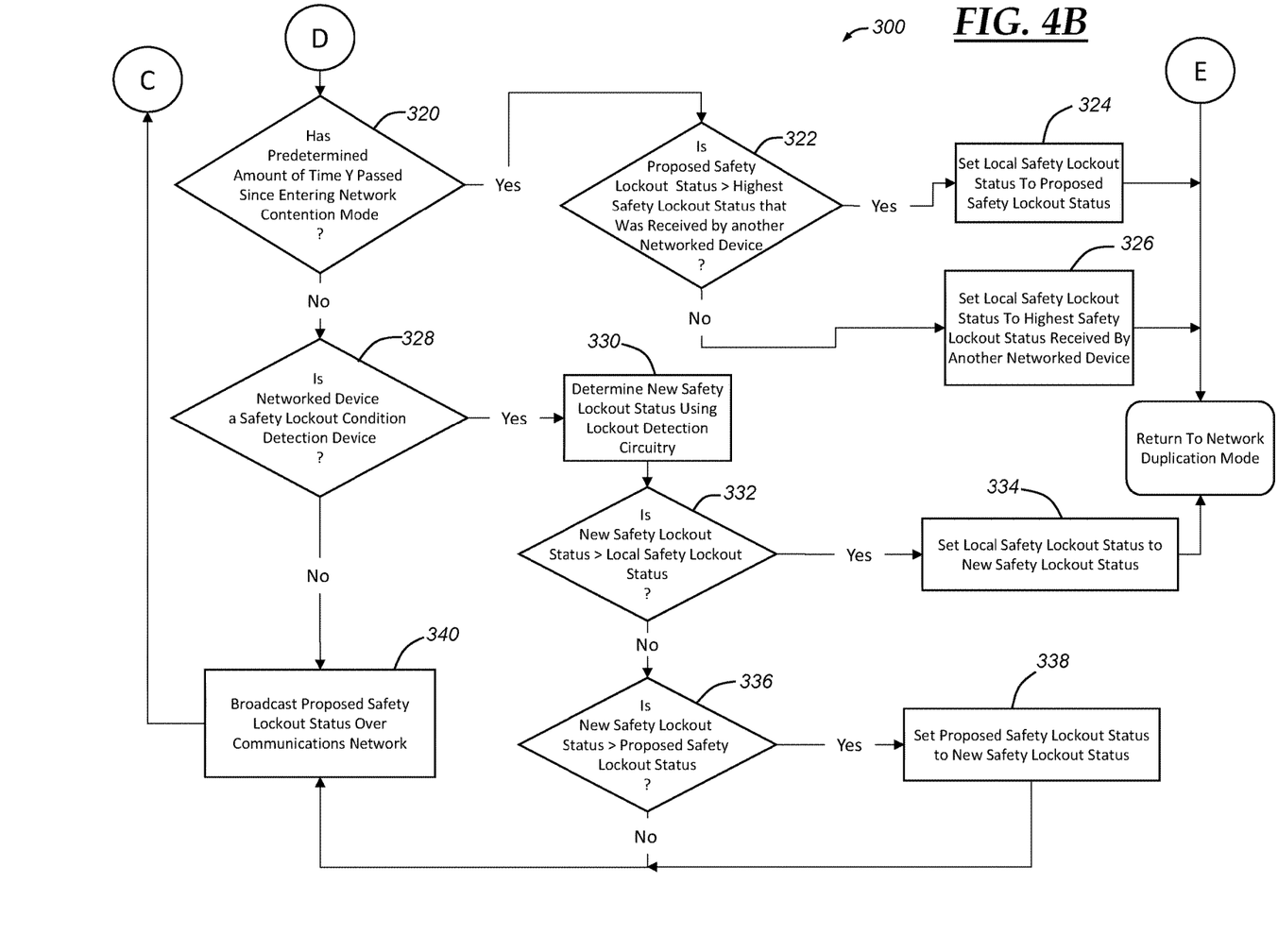

With reference to FIGS. 4A-4B, a process 300 for carrying out the network contention mode 166 at a networked device is illustrated. In at least some embodiments, each networked device 102-110 selects a proposed safety lockout status, which can be defaulted to a predetermined value such as the base value as indicated at step 302. In some embodiments, the networked device can override this predetermined proposed status/value and use another safety lockout status as the proposed safety lockout status. Also, in the case of a safety lockout condition detection device operating in the network contention mode, the lockout detection circuitry (e.g., lockout detection circuitry 122, 124) can be used to determine a proposed safety lockout status instead of using a predetermined or default status/value (steps 304-306).

At the beginning of the network contention mode, the local (or current) safety lockout status for each of the networked devices may be locked or not changed, except when it is determined to be changed in steps 314, 318, 324, 326, and 334. Each of the networked devices listens for a proposed safety lockout status from one or more of the other networked devices (step 308) and, as indicated by step 310, when a proposed safety lockout status is received from another networked device, the process 300 continues to step 312; otherwise, the process 300 continues to step 316. When the local safety lockout status is less than (or not as severe as) a proposed safety lockout status received over the communications network, then the local safety lockout status can be increased to match the proposed safety lockout status (or can be set to the proposed safety lockout status) (steps 312-314) that was received over the communications network and that is most severe (or the highest).

When all networked devices have set a proposed safety lockout status to the base value (which can be represented by a status of zero (0) or other minimum/initial value/status), then the local safety lockout status for each networked device is set to the base value (steps 316-318). The determination of step 316 may take into consideration a first predetermined amount of time X; for example, the determination of step 316 may include determining whether all networked devices have set a proposed safety lockout status to the base value within the last X seconds and, if so, the process 300 proceeds to step 318 where the local safety lockout status is set to the base value; otherwise, the process 300 proceeds to step 320.

In step 320, it is determined whether a second predetermined amount of time Y has passed since the networked device has been operating in the network contention mode 166 and, if so, the process 300 proceeds to step 322; otherwise, the process 300 continues to step 328. In step 322, a determination may be made as to whether the proposed safety lockout status is greater than the highest (or most severe) safety lockout status that was received by another networked device over the communications network 130. For example, as shown in step 322, it may be determined whether the proposed safety lockout status is greater than the highest (or most severe) safety lockout status that was received by another networked device over the communications bus in the last X seconds, where X seconds can be a predetermined amount of time that is the same or different from the predetermined amount of time Y. When the proposed safety lockout status is greater than the highest (or most severe) safety lockout status that was received by another networked device, then the local (or current) safety lockout status can be set to the proposed safety lockout status (step 324); otherwise, the local (or current) safety lockout status can be set to the highest (or most severe) safety lockout status that was received by another networked device while in the network contention mode (or during the last X seconds) (step 326); for example, in one embodiment, the local safety lockout status is set to the highest (or most severe) safety lockout status that was received by another networked device within the last X seconds (or within another predetermined amount of time).

As indicated by step 328, for networked devices that are not safety lockout condition detection devices (or that do not include lockout detection circuitry), the proposed safety lockout status is broadcast over the communications network (step 340). In one embodiment, the proposed safety lockout status can be broadcast at regular intervals. Also, as indicated by step 328, for networked devices that are safety lockout condition detection devices, the proposed safety lockout status or the local (or current) safety lockout status is updated to a new value as determined by the lockout detection circuitry of the safety lockout condition detection device. For example, in step 330, a new safety lockout status is detected by the lockout detection circuitry of the safety lockout condition detection device. This new safety lockout status can then be compared to the local (or current) safety lockout status (step 332) and, if the new safety lockout status is higher than the local (or current) safety lockout status, the local (or current) safety lockout status is set to the new safety lockout status (step 334); otherwise, the process 300 continues to step 336.

In step 336, the new safety lockout status is compared to the proposed safety lockout status and, if the new safety lockout status is higher than the proposed safety lockout status, then the proposed safety lockout status is set to the new safety lockout status as shown in step 338. After step 338, the process 300 proceeds back to step 340 where the proposed safety lockout status is broadcast over the communications network 130. Each of the networked devices may return to the network contention mode when the networked device reaches the "Return to Network Duplication Mode" step, as illustrated in FIG. 4B, for example. In other embodiments, the transition from the network contention mode to the network duplication mode may be coordinated, such as by one of the networked devices sending an end contention mode (END_CONTENTION) signal over the communications network.

The process 200 and the process 300 include certain decision blocks (202, 304, 328) that query whether the networked device is a safety lockout condition detection device. In one embodiment, any one or more of these decision blocks may be implemented by the networked device inspecting networked device-specific data (e.g., a flag stored in memory of the networked device) that indicates whether the networked device is a safety lockout condition detection device. In other embodiments, any one or more of these decision blocks may not correspond to any actual step performed or action taken by the networked device. In such embodiments, a different version of the consensus protocol may be used by networked devices of different types, such as a first version of the consensus protocol being used by the safety lockout condition detection devices and second version of the consensus protocol being used by the other networked devices.

At least according to some embodiments, all networked devices operate independently, but are able to communicate with each other over the communications network. At least according to some embodiments, all networked devices regularly broadcast their local copy of the lockout severity level (their local safety lockout status) to all other networked devices in the system. At least according to some embodiments, at boot/restart, each networked device has its severity level (or local safety lockout status) set to the base value (e.g., a minimum value, such as zero). At least according to some embodiments, each networked device on the network listens to all other networked devices on the network and, if it sees (or detects) a severity level (or safety lockout status) higher than its own, the networked device will elevate its own severity level (or local safety lockout status) to match the highest value/status broadcast on the network. In this way, all networked devices copy the highest level observed at that networked device, and agree as to what that level or safety lockout status is. In at least some embodiments, this ensures propagation of the state (e.g., the safety lockout status) across the network.

At least according to some embodiments, the first electronic controller 102 (or a first networked device) and the second electronic controller 104 (or a second networked device) drive or otherwise control an electromechanical system that is safety critical, which means that operation of the electromechanical device is critical to safety of the system or the recreational vehicle. For example: the first electronic controller 102 drives an RV slide-out, while the second electronic controller 104 drives an RV leveling system or leveler. At least according to some embodiments, a third networked device 106 does not control any safety related system (or detects a safety lockout condition), but nonetheless still participates in network traffic and retains a copy of the lockout severity level as the local safety lockout status.

At least according to some embodiments, the safety lockout condition detection devices 108, 110 are independent from each other, and may independently detect a safety lockout condition. For example: the first safety lockout condition detection device 108 may detect a safety lockout condition if it detects trailer movement via one or more global navigation satellite system (GNSS) signals (e.g., global positioning system (GPS) signals) that are received by a GNSS receiver, while the second safety lockout condition detection device 110 may detect a safety lockout condition in response to detecting that a parking brake of a trailer of the RV is disengaged. Other safety lockout conditions can include a trailer brake status, a tow vehicle brake status, a tow vehicle brake light status, and an orientation or movement detected by a movement/orientation sensor, such as an accelerometer, gyro sensor, tilt sensor, or angle sensor.

At least according to some embodiments, when the first or second safety lockout condition detection devices 108, 110 detects a safety lockout condition, then the safety lockout device: (1) elevates its own severity level (or local safety lockout status) to a value indicating the severity of the detected condition (increasing value indicates increasing severity); and (2) then broadcasts the severity level (or safety lockout status) to all other networked devices on the communications network. In at least some of such cases, all networked devices on the communications network receive the signal, and increase their own copy of the severity level to match the received signal. When a networked device has a higher severity level than the received signal, the networked device level remains unchanged.

At least according to some embodiments, the electronic controllers 102, 104, in response to observing an elevated safety lockout status, limit or prevent operation of any attached or associated electromechanical system or device. In one embodiment, when the safety lockout status is above a predetermined threshold value or set to a predetermined threshold status, the electronic controller may determine to stop all electromechanical operations altogether, or may determine to stop those electromechanical operations associated with the predetermined threshold value or status.

At least according to some embodiments, the passive networked device 106 receives the safety lockout status and records it locally as a local safety lockout status. Even though the passive networked device 106 may have no attached control system, it nonetheless still participates in the communications and is a source of good data on the network, such as data indicative of an accurate safety lockout status.

With respect to the illustrated embodiment of FIG. 1, consider a scenario in which the safety lockout condition detection devices 108, 110 are disabled (e.g., powered down) or fail: even though the disabled or failed safety lockout condition detection devices 108, 110 are no longer capable of detecting a safety lockout condition, the network by virtue of the other networked devices, such as the passive networked device 106, retains a copy of the previously detected safety lockout status. In this way, even if some or many networked devices fail or power down, the state of the safety interlock severity level (or safety lockout status) is preserved. The level or safety lockout status is preserved as long as at least one networked device remains enabled.

With respect to the illustrated embodiment of FIG. 1, consider a scenario in which the passive networked device 106 issues a clear command to clear the safety lockout status (i.e., reset the safety lockout status to the base value): the passive networked device 106 issues the clear command, which causes an election or voting period on the network to begin in which all other networked devices may vote. In this case, the electronic controllers 102, 104 vote and agree to clear the safety lockout status. The first safety lockout condition detection device 108 also votes to clear the safety lockout status provided that the first safety lockout condition detection device 108 does not detect a safety lockout condition. The second safety lockout condition detection device 110, however, detects that a safety lockout condition still exists, and vetoes the clear command on the network (or votes against the clearing of the safety lockout status). In this example, as all networked devices have not established a consensus, the clear command issued by the passive networked device 106 is vetoed, and the network remains in the elevated lockout severity level condition or at the elevated safety lockout status.

At least according to some embodiments, the concept of a LOCKOUT_SEVERITY_LEVEL (which may be represented by a safety lockout status) is used and communicated between the networked devices, according to the following description: lower values indicate less severity (the base value can be zero or some other default value that indicates the RV is safe to carry out certain operations (e.g., be set to a drive gear)); higher values indicate increasing level of severity; each networked device on the network has its own LOCAL copy of LOCKOUT_SEVERITY_LEVEL, which can also be referred to as the local safety lockout status; and at boot/reset, the LOCAL copy of LOCKOUT_SEVERITY_LEVEL is set to the base value.

At least according to some embodiments, in the network duplication mode: the LOCKOUT_SEVERITY_LEVEL (or safety lockout status) is duplicated across all networked devices on the network to ensure that all networked devices are in the same failsafe state (or at least are aware of the same safety lockout status); all networked devices on the network will regularly broadcast their LOCKOUT_SEVERITY_LEVEL (or safety lockout status) to all other networked devices on the network; this broadcast can occur at a predetermined data rate (e.g., data is transmitted once per second), and/or may be transmitted upon a change of state or in response to a predetermined event; any networked device may escalate (or increase) the safety lockout status and, upon doing so, the new safety lockout status is immediately broadcast to all other networked devices on the network to reduce latency; and/or all networked devices listen to the network and receive a LOCKOUT_SEVERITY_LEVEL (or safety lockout status) broadcast from the other networked devices, and: if any networked device receives a LOCKOUT_SEVERITY_LEVEL (or safety lockout status) that is larger than its local value (or local safety lockout status), then the networked device's local value (or local safety lockout status) will be set to match the received value, or if the local value (or safety lockout status) is larger, the local value (or local safety lockout status) remains unchanged (and is retransmitted at the next scheduled interval).

At least according to some embodiments, in the network duplication mode: any one or more safety lockout condition detection devices may be used to elevate the local safety lockout status when appropriate. According to at least one embodiment, multiple networked devices may be a safety lockout condition detection device, and may be capable of detecting at least one safety lockout condition. In some embodiments, each safety lockout condition detection device may detect a different safety lockout condition than another safety lockout condition detection device, which may result in the safety lockout condition detection devices determining different safety lockout statuses; that is, the proposed safety lockout statuses as determined by each of the safety lockout condition detection devices do not need to agree with one another. In some embodiments, these safety lockout condition detection devices are the sources of lockouts on the network since they are the devices that initially increase the safety lockout status.

At least according to some embodiments, in the network duplication mode: when two networked devices indicate different values for LOCKOUT_SEVERITY_LEVEL (or the safety lockout status), the networked device with the less severe local safety lockout status will increase its local safety lockout status to match the local safety lockout status of the other networked device. In this way, all networked devices eventually echo the highest value (or most severe safety lockout status) observed and all networked devices on the network duplicate the LOCKOUT_SEVERITY_LEVEL (or safety lockout status) across the network, and agree with each other as a result of the network contention mode.

At least according to some embodiments, the only way to clear or otherwise de-escalate the LOCKOUT_SEVERITY_LEVEL (or safety lockout status) is through first broadcasting a clear request (CLEAR_REQUEST) over the communications network. In one embodiment, any device on the network may issue a CLEAR_REQUEST (even networked devices that do not have lockout condition detection circuitry). In at least some embodiments, upon (or in response to) transmission of the clear request, a network contention period or mode, such as the network contention mode 166 (and/or process 300), is started to allow the requested change to propagate across the network.

At least according to some embodiments, in the network contention mode: the current value of LOCKOUT_SEVERITY_LEVEL (or safety lockout status) is frozen (i.e., fixed, locked) and the networked device will continue to behave as if the LOCKOUT_SEVERITY_LEVEL (or safety lockout status) has not changed for the duration of the network contention mode. This value will be referred to as the CURRENT value or local safety lockout status. In one embodiment, the networked device will choose a proper or proposed LOCKOUT_SEVERITY_LEVEL (or safety lockout status) in response to the clear request, which will be referred to as the PROPOSED value or proposed safety lockout status. At least in some embodiments, the PROPOSED value is defaulted to the base value, which may be used to allow full clear of LOCKOUT_SEVERITY_LEVEL (or safety lockout status), or the proposed safety lockout status may be determined based on detecting (or determining the presence of) a safety lockout condition at the time of receiving the clear request. In some embodiments, the default proposed safety lockout status may be set to another de-escalated LOCKOUT_SEVERITY_LEVEL (or safety lockout status), that is less severe than the local safety lockout status, but that is not the base value.

At least according to some embodiments, in the network contention mode: the networked devices stop broadcasting their CURRENT LOCKOUT_SEVERITY_LEVEL (or local safety lockout status) over the communications network, and instead begin to broadcast their PROPOSED value (or proposed safety lockout status), which may include broadcasting the proposed safety lockout status according to a fixed transmission interval, for example. At least according to some embodiments, in the network contention mode: the networked devices continue to listen on the network for messages from other networked devices on the bus to determine whether the other networked devices have acknowledged the clear request. In one embodiment, when a networked device on the network broadcasts a LOCKOUT_SEVERITY_LEVEL (or safety lockout status) that is greater than the CURRENT LOCKOUT_SEVERITY_LEVEL (or local safety lockout status), then: the LOCKOUT_SEVERITY_LEVEL (or local safety lockout status) is increased to the value seen on the bus; and the network contention mode ends and normal operation (or the network duplication mode) resumes.

At least according to some embodiments, in the network contention mode: if all networked devices on the network broadcast a safety lockout status that is set to the base value (e.g., the LOCKOUT_SEVERITY_LEVEL is zero) for a fixed period of time (or a predetermined amount, which can be represented as X seconds) (e.g., 2.2 seconds) with no interruption (e.g., with no networked device broadcasting a safety lockout status that is not the base value), then: the safety lockout status is decreased to the proposed safety lockout status value, which is the base value; and the network contention mode ends and normal operation (or the network duplication mode) resumes.

At least according to some embodiments, if the network contention period expires (which can be defined as a second predetermined amount of time (e.g., 5 seconds) taken from the time when the CLEAR_REQUEST is sent, for example) without agreement between the networked devices, then: (i) the safety lockout status is set to whichever of the following values is larger or more severe: (a) the largest or most severe value seen on the network during the last X seconds (e.g., 2.2 seconds) of network activity, or (b) the PROPOSED value of the local networked device; and (ii) the network contention mode ends and normal operation (or the network duplication mode) resumes.

At least according to some embodiments, if a safety lockout condition detection device determines to increase the local safety lockout status to a new status or value (e.g., the LOCKOUT_SEVERITY_LEVEL to a NEW_LEVEL), which can be increased based on detecting a safety lockout condition using safety lockout detection circuitry, then: (i) if the new status or value is greater than the current or local safety lockout status (e.g., the NEW_LEVEL>CURRENT), then: (a) the local safety lockout status is increased to the new status or value, and (b) the network contention mode ends and normal operation (or the network duplication mode) resumes; (ii) if the new status or value is less than or equal to the current or local safety lockout status and the new status or value is greater than the proposed safety lockout status (e.g., CURRENT>=NEW_LEVEL>PROPOSED), then: (a) the proposed safety lockout status is set to the new status or value, and (b) the network contention mode continues; and (iii) if the new status or value is less than the proposed safety lockout status (e.g., NEW_LEVEL<PROPOSED), then: no action is taken. In at least some embodiments, after the network contention mode ends, the safety lockout status (or LOCKOUT_SEVERITY_LEVEL) is transmitted on the network according to a normal operation or according to the network duplication mode.

In at least some embodiments, all networked devices participate in the network duplication mode, even if the networked device does not otherwise use the information, such as for determining whether to control an electromechanical device. In this way, at least according to some embodiments, this method/system maximizes (or at least improves) the ability of the network to retain the correct safety lockout status (or LOCKOUT_SEVERITY_LEVEL), even if most of the networked devices on the network are powered down, otherwise disabled, or fail. For example: when a first networked device detects and sets an elevated LOCKOUT_SEVERITY_LEVEL, other networked devices hold and retain a copy of the safety lockout status even if the first networked device is powered down.

In at least some embodiments, all networked devices on the network must agree before the safety lockout status (or LOCKOUT_SEVERITY_LEVEL) is decreased or cleared (i.e., set to the base value). Essentially, in some embodiments, all networked devices must vote to determine if it is appropriate to set the safety lockout status to the base value or other de-escalated value. For example, if one networked device disagrees with the clear request (CLEAR_REQUEST), then the networked device may prevent the safety lockout status of the other networked devices from being set to the base value.

In at least some embodiments, the method/system allows for more than one networked device to implement lockout condition detection circuitry, and these networked devices may implement this lockout detection circuitry in different ways. The networked devices do not need to be in agreement when a lockout condition occurs, they only need to be in agreement as to what the safety lockout status is and what to do next. The system is designed to capture and duplicate the highest safety lockout status (or LOCKOUT_SEVERITY_LEVEL) observed on the network. For example, if two or more safety lockout condition detection devices detect a safety lockout condition at or around the same time, then the safety lockout status used by the network is the highest (or most severe) safety lockout status. Therefore, in such embodiments, the most serious condition detected on the network (or the most severe safety lockout status) is given priority.

This description, rather than describing limitations of an invention, only illustrates embodiments of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. A method for controlling an electromechanical operation of an electromechanical device based on a safety lockout condition determined using a distributed safety lockout system, the distributed safety lockout system comprising a plurality of networked devices communicatively coupled via a communications network, the plurality of networked devices including one or more electronic controllers and a plurality of safety lockout condition detection devices; the method comprising:
   at one or more of the plurality of networked devices:
      receiving a safety lockout status from another networked device via the communications bus;
      comparing a local safety lockout status to the received safety lockout status;
      determining whether to update the local safety lockout status based on results of comparing the local safety lockout status to the received safety lockout status and, when it is determined to update the local safety lockout status, then updating the local safety lockout status to the received safety lockout status; and
      broadcasting the local safety lockout status over the communications bus;
   at one or more of the plurality of safety lockout condition detection devices:
      determining a proposed safety lockout status based on sensor data obtained by the safety lockout device;
      comparing the proposed safety lockout status to the local safety lockout status and/or a received safety lockout status that is received from another networked device over the communications bus; and
      determining an updated local safety lockout status to be the local safety lockout status based on comparing the proposed safety lockout status to the local safety lockout status and/or the received safety lockout status; and
   at any of the one or more electronic controllers, controlling an electromechanical operation of an electromechanical device based on the local safety lockout status.

2. The method of claim 1, wherein the distributed safety lockout system is installed on a recreational vehicle.

3. The method of claim 2, wherein the distributed safety lockout system includes a plurality of electronic controllers including the one or more electronic controllers and a plurality of electromechanical devices including the electromechanical device(s), and wherein each of the plurality of electromechanical devices is controlled by a different one of the plurality of electronic controllers.

4. The method of claim 3, wherein a first electronic controller of the plurality of electronic controllers controls the electromechanical operation of a first electromechanical device of the plurality of electromechanical devices, wherein a second electronic controller of the plurality of electronic controllers controls the electromechanical operation of a second electromechanical device of the plurality of electromechanical devices, and wherein the first electronic controller operates independently of the second electronic controller.

5. The method of claim 4, wherein the first electromechanical device is a leveler that is installed on the recreational vehicle, and wherein the second electromechanical device is a slide-out that is installed on the recreational vehicle.

6. The method of claim 1, wherein the plurality of safety lockout condition detection devices include a first safety lockout condition detection device and a second safety lockout condition detection device, wherein the first safety lockout condition detection device is configured to detect a first safety lockout condition, wherein the second safety lockout condition detection device is configured to detect a second safety lockout condition that is different from the first safety lockout condition.

7. The method of claim 6, wherein the first safety lockout condition and the second safety lockout condition are each based on at least one of the following: global navigation satellite system (GNSS) signals received at a GNSS receiver, a parking brake status, a trailer brake status, a tow vehicle brake status, a tow vehicle brake light status, or an orientation or movement detected by a movement/orientation sensor, and wherein the first safety lockout condition is different than the second safety lockout condition.

8. The method of claim 1, wherein the communications network is a wired controller area network (CAN) bus or a wired local interconnect network that is installed on the recreational vehicle.

9. The method of claim 1, wherein the communications network is a wireless communications network that is carried out using a dedicated short-range communication (DSRC) network that is provided on the recreational vehicle.

10. The method of claim 1, wherein the communications network includes a wireless communications network used by a first one of the networked devices and a wired communications network used by a second one of the networked devices.

11. The method of claim 1, wherein one or more of the networked devices operate according to a consensus protocol that includes a network duplication mode and a network contention mode, wherein, when in the network contention mode, one or more of the networked devices votes to establish a consensus as to whether the local safety lockout status of each of the networked devices is to be de-escalated.

12. The method of claim 11, wherein, in response to a first one of the networked devices issuing a clear request when each of the networked devices are operating in the network duplication mode, each of the networked devices transitions to operate in the network contention mode to establish consensus.

13. A distributed safety lockout system for a recreational vehicle, comprising:
a plurality of networked devices installed on an electromechanical system, the plurality of networked devices being communicatively coupled via a communications bus, and the plurality of networked devices including:
one or more electronic controllers, each configured to control an electromechanical device of the recreation vehicle based on a local safety lockout status; and
a plurality of safety lockout condition detection devices, each safety lockout condition detection devices configured to detect a safety lockout status based on sensor information obtained by lockout detection circuitry;
wherein one or more of the plurality of networked devices are configured to alternate between a network duplication mode and a network contention mode and, when operating in the network duplication mode, to determine an updated local safety lockout status based on a comparison of the local safety lockout status to a received lockout safety status, the received lockout safety status being received over the communications bus from another one of the networked devices; and
when operating in the network contention mode, each device of the plurality of safety lockout condition detection devices is configured to obtain the detected safety lockout status based on the sensor information, to compare the detected safety lockout status to the local safety lockout status and/or a received proposed safety lockout status, to set the local safety lockout status based on the comparison, and to broadcast the local safety lockout status over the communications bus.

14. The distributed safety lockout system of claim 13, wherein the distributed safety lockout system includes a plurality of electronic controllers including the one or more electronic controllers and a plurality of electromechanical devices including the electromechanical device(s), and wherein each of the plurality of electromechanical devices is controlled by a different one of the plurality of electronic controllers.

15. The distributed safety lockout system of claim 14, wherein a first electronic controller of the plurality of electronic controllers controls the electromechanical operation of a first electromechanical device of the plurality of electromechanical devices, wherein a second electronic controller of the plurality of electronic controllers controls the electromechanical operation of a second electromechanical device of the plurality of electromechanical devices, and wherein the first electronic controller operates independently of the second electronic controller.

16. The distributed safety lockout system of claim 15, wherein the first electromechanical device is a leveler that is installed on the recreational vehicle, and wherein the second electromechanical device is a slide-out that is installed on the recreational vehicle.

17. The distributed safety lockout system of claim 13, wherein the plurality of safety lockout condition detection devices include a first safety lockout condition detection device and a second safety lockout condition detection device, wherein the first safety lockout condition detection device is configured to detect a first safety lockout condition, wherein the second safety lockout condition detection device is configured to detect a second safety lockout condition that is different from the first safety lockout condition.

18. The distributed safety lockout system of claim 17, wherein the first safety lockout condition and the second safety lockout condition are each based on at least one of the following: global navigation satellite system (GNSS) signals received at a GNSS receiver, a parking brake status, a trailer brake status, a tow vehicle brake status, a tow vehicle brake light status, or an orientation or movement detected by a movement/orientation sensor, and wherein the first safety lockout condition is different than second safety lockout condition.

19. The distributed safety lockout system of claim 13, wherein the communications network is a wired controller area network (CAN) bus or a wired local interconnect network that is installed on the recreational vehicle.

20. The distributed safety lockout system of claim 13, wherein the communications network is a wireless communications network that is carried out using a dedicated short-range communication (DSRC) network that is provided on the recreational vehicle.

21. The distributed safety lockout system of claim 13, wherein the communications network includes a wireless communications network used by a first one of the networked devices and a wired communications network used by a second one of the networked devices.

22. The distributed safety lockout system of claim 13, wherein each of the networked devices operate according to a consensus protocol that includes the network duplication mode and the network contention mode, wherein, when in the network contention mode, each of the networked devices votes to establish a consensus as to whether the local safety lockout status of each of the networked devices is to be de-escalated.

* * * * *